United States Patent
Lee

(10) Patent No.: US 7,046,310 B2
(45) Date of Patent: May 16, 2006

(54) DISPLAY APPARATUS AND A TUNER MOUNTED THEREON

(75) Inventor: You-Sub Lee, Kunpo (KR)

(73) Assignee: Samsung Electronics Co., Ltd., Suwon-si (KR)

(*) Notice: Subject to any disclaimer, the term of this patent is extended or adjusted under 35 U.S.C. 154(b) by 754 days.

(21) Appl. No.: 10/086,825

(22) Filed: Mar. 4, 2002

(65) Prior Publication Data
US 2002/0171774 A1    Nov. 21, 2002

(30) Foreign Application Priority Data
May 21, 2001  (KR) ................. 2001-27812
May 21, 2001  (KR) ................. 2001-27813

(51) Int. Cl.
*H04N 5/64*   (2006.01)

(52) U.S. Cl. ............... 348/836; 348/794; 348/789; 348/839; 348/731; 334/85; 312/7.2; 455/347

(58) Field of Classification Search ........... 348/725, 348/726, 730, 739, 759, 789, 795, 731, 794, 348/836, 787, 839, 843; 334/85, 88, 89; 312/7.2, 223.1, 223.2; 455/300, 477, 349, 455/348
See application file for complete search history.

(56) References Cited

U.S. PATENT DOCUMENTS

| 4,969,046 | A | * | 11/1990 | Sugimoto et al. | 348/839 |
| 5,508,756 | A | * | 4/1996 | Landy et al. | 348/725 |
| 5,949,493 | A | * | 9/1999 | Mudra et al. | 348/553 |
| 5,969,776 | A | * | 10/1999 | Han | 348/836 |
| 6,400,419 | B1 | * | 6/2002 | Yamamoto | 348/731 |
| 6,693,680 | B1 | * | 2/2004 | Cho et al. | 348/836 |

FOREIGN PATENT DOCUMENTS

JP        2001-78120    *  3/2001

* cited by examiner

*Primary Examiner*—John Miller
*Assistant Examiner*—Jean W. Désir
(74) *Attorney, Agent, or Firm*—Robert E. Bushnell, Esq.

(57) ABSTRACT

Disclosed is a display apparatus including a front cover, a rear cover coupled the front cover and forming an accommodating space, a display panel disposed inside the accommodating space, a main PCB having a signal processor and transmitting a video signal to the display panel, and a PCB supporting member supporting the main PCB. The display apparatus includes a TV tuner unit having a TV tuner receiving the TV video signal, a casing accommodating the TV tuner, and a connector electrically connected with the TV tuner, a tuner unit accommodating part accommodating the TV tuner unit, and a connection port provided at the tuner unit accommodating part for transmitting the TV video signal from the TV tuner unit to the signal processor.

25 Claims, 9 Drawing Sheets

DISPLAY APPARATUS AND A TUNER MOUNTED THEREON

CLAIM OF PRIORITY

This application makes reference to, incorporates the same herein, and claims all benefits accruing under 35 U.S.C. §119 from an application for DISPLAYING DEVICE earlier filed in the Korean Industrial Property Office on May 21, 2001 and there duly assigned Serial No. 27812/2001, and an application for DISPLAYING DEVICE earlier filed in the Korean Industrial Property Office on May 21, 2001 and there duly assigned Serial No. 27813/2001 by that Office.

BACKGROUND OF THE INVENTION

1. Field of the Invention

The present invention relates in general to a display apparatus, and more particularly, a display apparatus provided with a television (TV) tuner easily mounted on and detached from the display apparatus.

2. Description of the Related Art

A TV tuner has been mounted inside a display apparatus including a cathode ray tube or a liquid crystal display device. Typically, the TV tuner is disposed between a front cover and a rear cover coupled to the front cover of the display apparatus. It is disadvantageous that when the front cover and the rear cover have to be disassembled in order to replace or repair the TV tuner mounted in the display apparatus.

Therefore, I contemplate a display apparatus provided with a TV tuner easily attached to and detached from the display apparatus without disassembling the case of the display apparatus.

SUMMARY OF THE INVENTION

It is an object of the present invention to provide an improved TV tuner able to be mounted on an exterior surface of a display apparatus.

It is another object to provide a housing of a display apparatus able to be coupled to a TV tuner on an exterior surface of the housing.

It is yet an object to provide a TV tuner able to be mounted on a display apparatus without disassembling of the display apparatus.

It is still another object to provide a TV tuner unit able to be slidably mounted on a display apparatus from outside of the display apparatus.

It is also an object to provide a TV tuner unit able to be easily combined into and removed from a display apparatus without disassembling of the display apparatus.

These and other objects of the present invention may be accomplished by providing a display apparatus including a front cover, a rear cover coupling with the front cover and forming an accommodating space, a display panel disposed within the accommodating space, a main PCB (printed circuit board) coupled to the display panel and having a signal processor and transmitting a video signal from the outside to the display panel, and a PCB supporting member supporting the main PCB within the display apparatus, and a TV tuner unit mounted on an outer surface of the rear cover. The TV tuner unit includes a TV tuner receiving the TV video signal, a casing accommodating the TV tuner, and a connector electrically connecting the display apparatus with the TV tuner. The display apparatus includes a tuner unit accommodating part provided at the rear cover for accommodating the TV tuner unit, and a connection port provided at the tuner unit accommodating part and being connected with the connector in order to transmit the TV video signal from the TV tuner unit to the signal processor.

Preferably, the tuner unit accommodating part is formed in a backside of the rear cover, and the TV tuner unit is removably combined with the tuner unit accommodating part from the back side of the rear cover. Thus, the TV tuner is easily combined into and removed from the rear cover.

Further, the TV tuner unit includes an earth (ground) terminal exposed outside the casing, a through hole formed on a part of the rear cover contacting with the TV tuner unit, and an earth spring having two ends fixed at the through hole and another part exposed outside the rear cover so as to contact with the earth terminal of the TV tuner unit. Thus, an electromagnetic interference (EMI) from the TV tuner unit is prevented.

Desirably, the connection port is protruded from the backside of the tuner unit accommodating part in parallel with an inserting direction of the TV tuner unit so as to be combined with the connector.

Preferably, the display apparatus includes a TV tuner cover removably coupled with the tuner unit accommodating part and shielding the TV tuner unit, and thus the outer appearance thereof may be finished cleanly.

Further, the display apparatus includes a combination manner combining the TV tuner unit to the rear cover. The combination manner includes a female screw part provided on the rear cover contacting with the TV tuner unit, and a male screw fixing the TV tuner unit at the rear cover by passing through the female screw part.

BRIEF DESCRIPTION OF THE DRAWINGS

A more complete appreciation of the invention, and many of the attendant advantages thereof, will be readily apparent as the same because better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
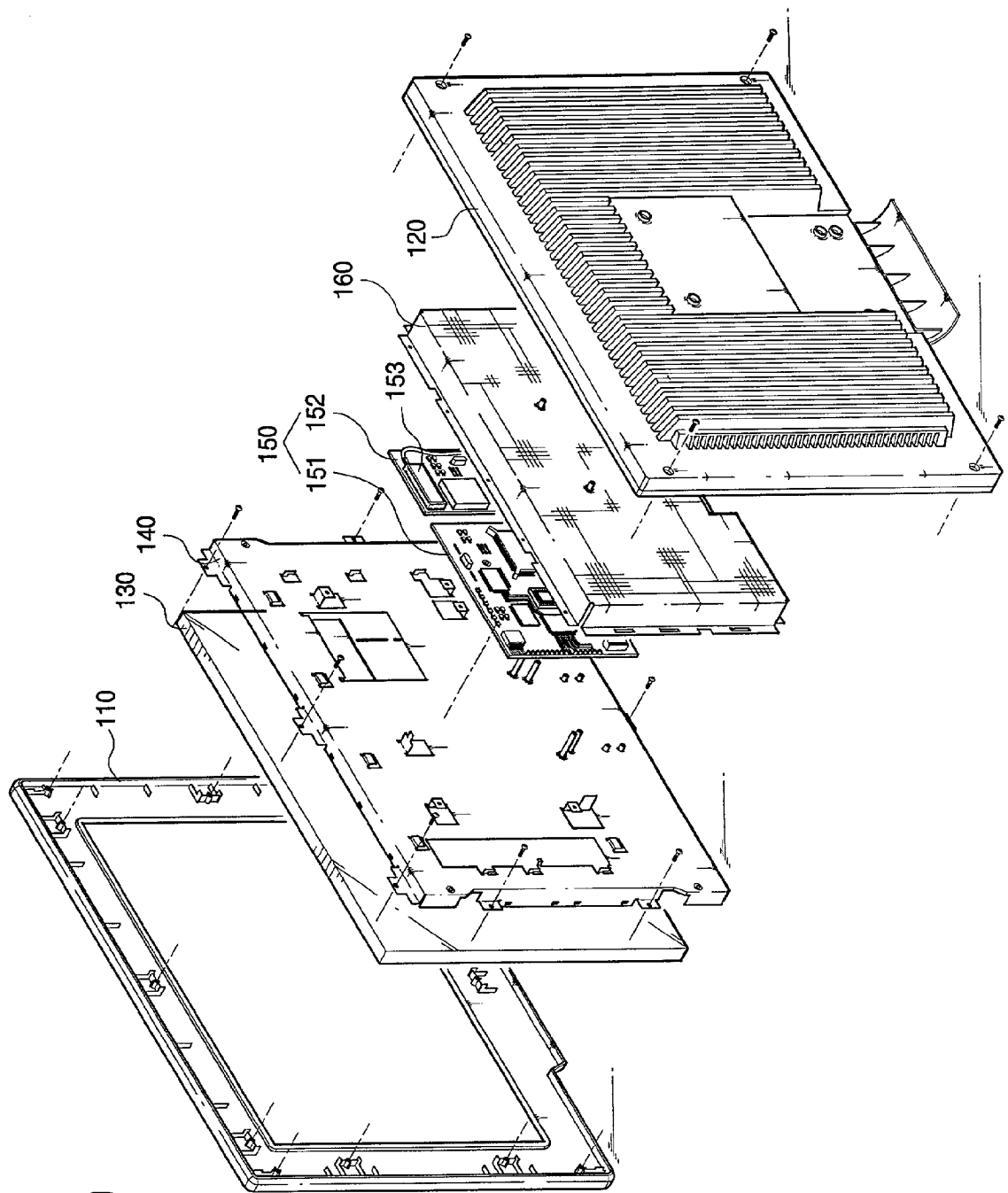
FIG. 1 is an exploded perspective view of a conventional display apparatus.

Turning now to drawings, FIG. 1 shows a conventional display apparatus equipped with a liquid crystal display (LCD) panel 130. The display apparatus includes front and rear covers 110 and 120 being coupled to each other and forming a predetermined accommodating space therebetween, LCD panel 130 having an effective surface on which a picture is displayed, a panel supporting member 140 supporting LCD panel 130, and a PCB assembly 150 supported by a PCB cover 160 and transmitting electric signals to LCD panel 130.

Figure 2:
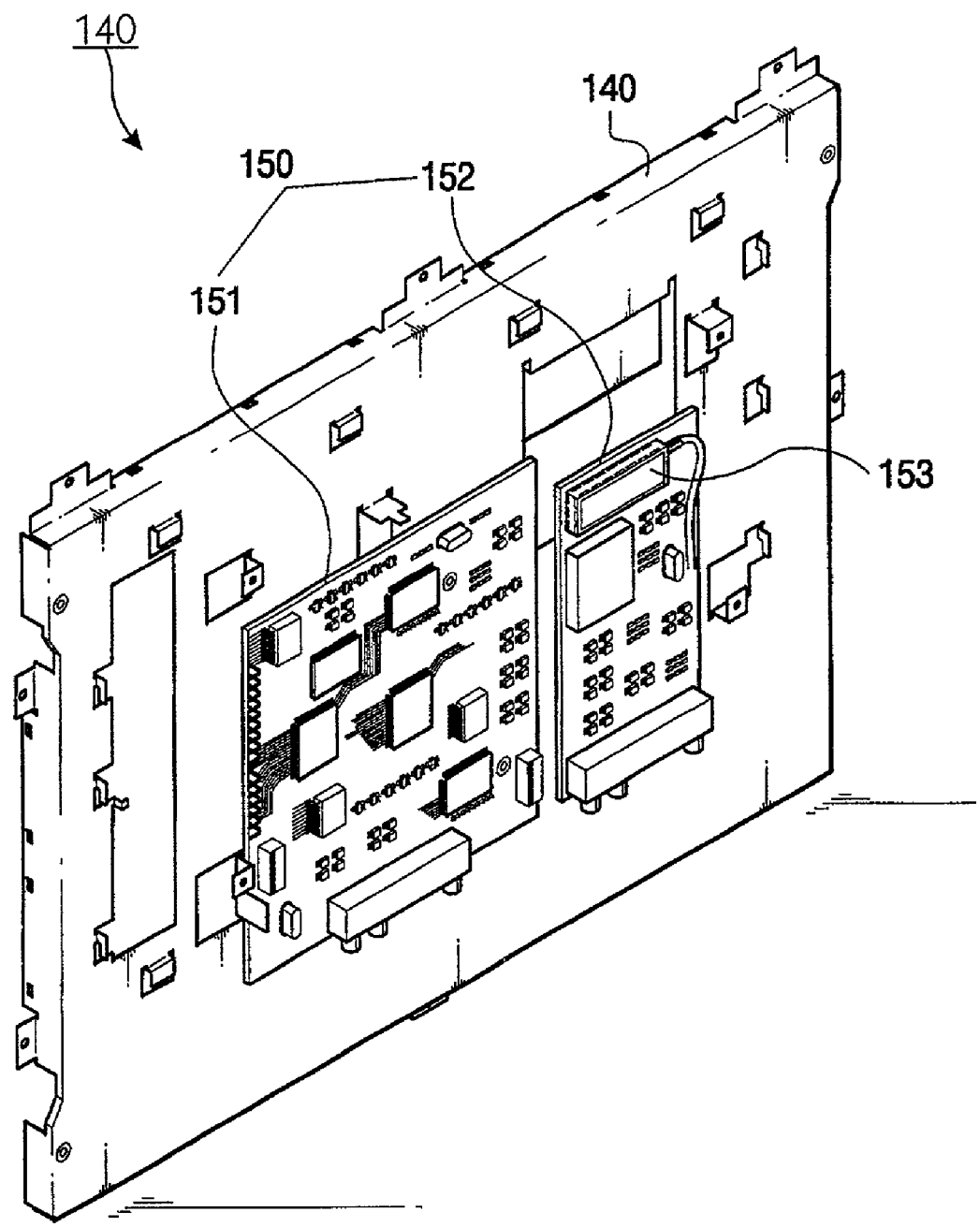
FIG. 2 is a perspective view of a conventional PCB assembly.

PCB assembly 150 supported by PCB cover 160, as shown in FIG. 2, incldes a main PCB 151 outputting a picture signal to LCD panel 130 and includes a TV tuner PCB 152 having a TV tuner 153 electrically connected to main PCB 151 and receiving a TV video signal from an external source.

Figure 7:
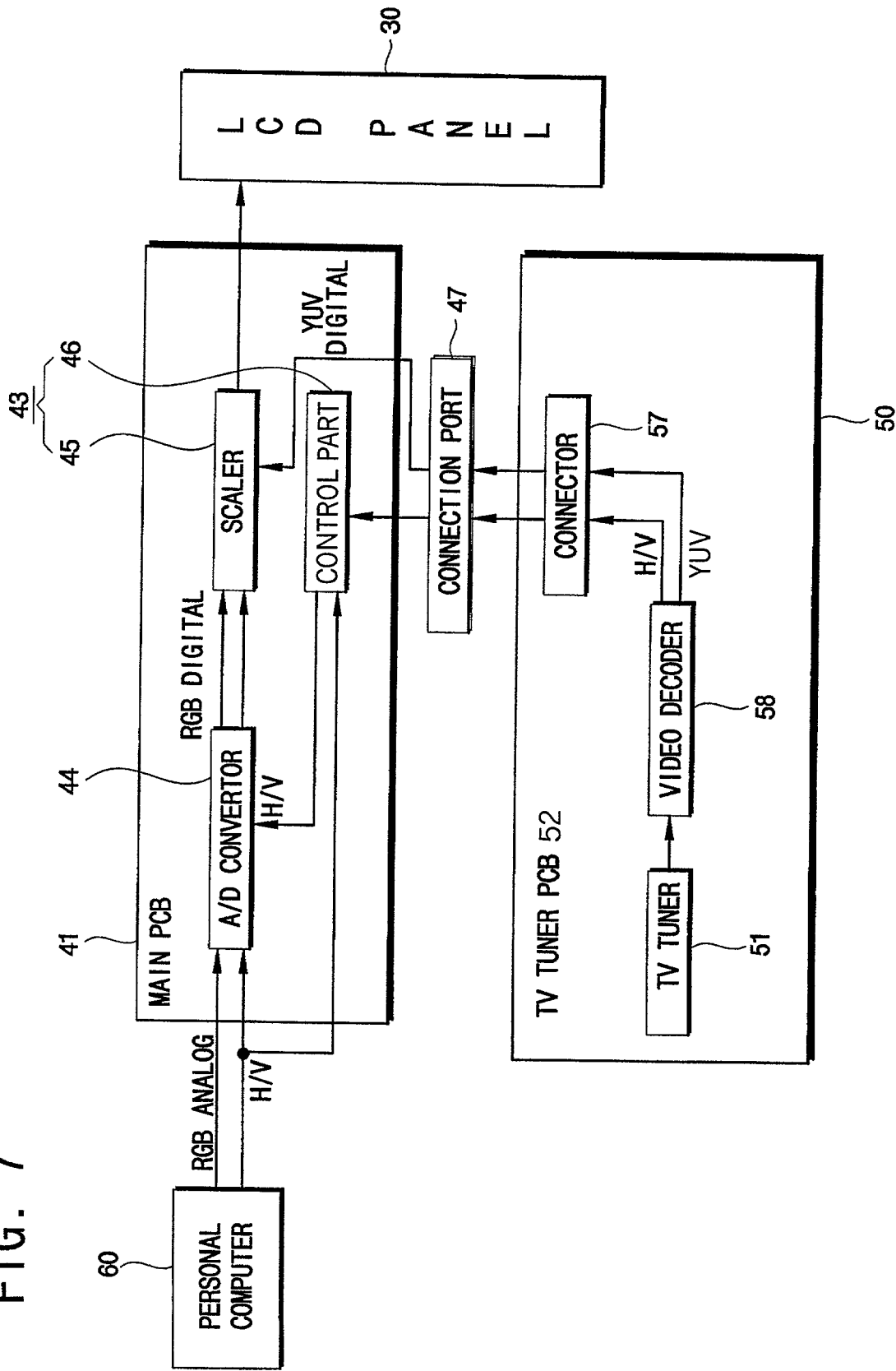
FIG. 7 is a block diagram of the display apparatus according to the present invention.

Main PCB 151 receives a computer picture signal from a personal computer (not shown) and outputs the picture signal to LCD panel 130 through, as shown in FIG. 7, a signal processor which has an analog/digital (A/D) converter 44 and a scaler 45. Further, main PCB 151 receives the TV video signal received at TV tuner 153 and outputs the picture signal to LCD panel 130 through the signal processor.

TV tuner 153 coupled to the display apparatus receives the TV video signal without a separate device, such as the personal computer, and outputs the picture signal to LCD panel 130 through main PCB 151. Thus, TV tuner PCB 152 should be equipped with not only TV tuner 153 but also a video decoder (not shown). The video decoder converts an analog video signal received at TV tuner 153 into a digital video signal, and transmits the digital video signal to the signal processor of main PCB 151. Then, the signal processor of main PCB 151 outputs the digital video signal (horizontal/vertical signals or YUV digital signals) received from TV tuner PCB 152, to LCD panel 130 through, as shown in FIG. 7, a control part 46 and the scaler 45. Consequently, the conventional display apparatus can output the TV video signal without a separate device.

However, in the conventional display apparatus shown in FIG. 1, TV tuner 153 and TV tuner PCB 152 are integrally installed in PCB cover 160. Thus, it is not easy for a user to install or replace the TV tuner within the display apparatus.

Figure 3:
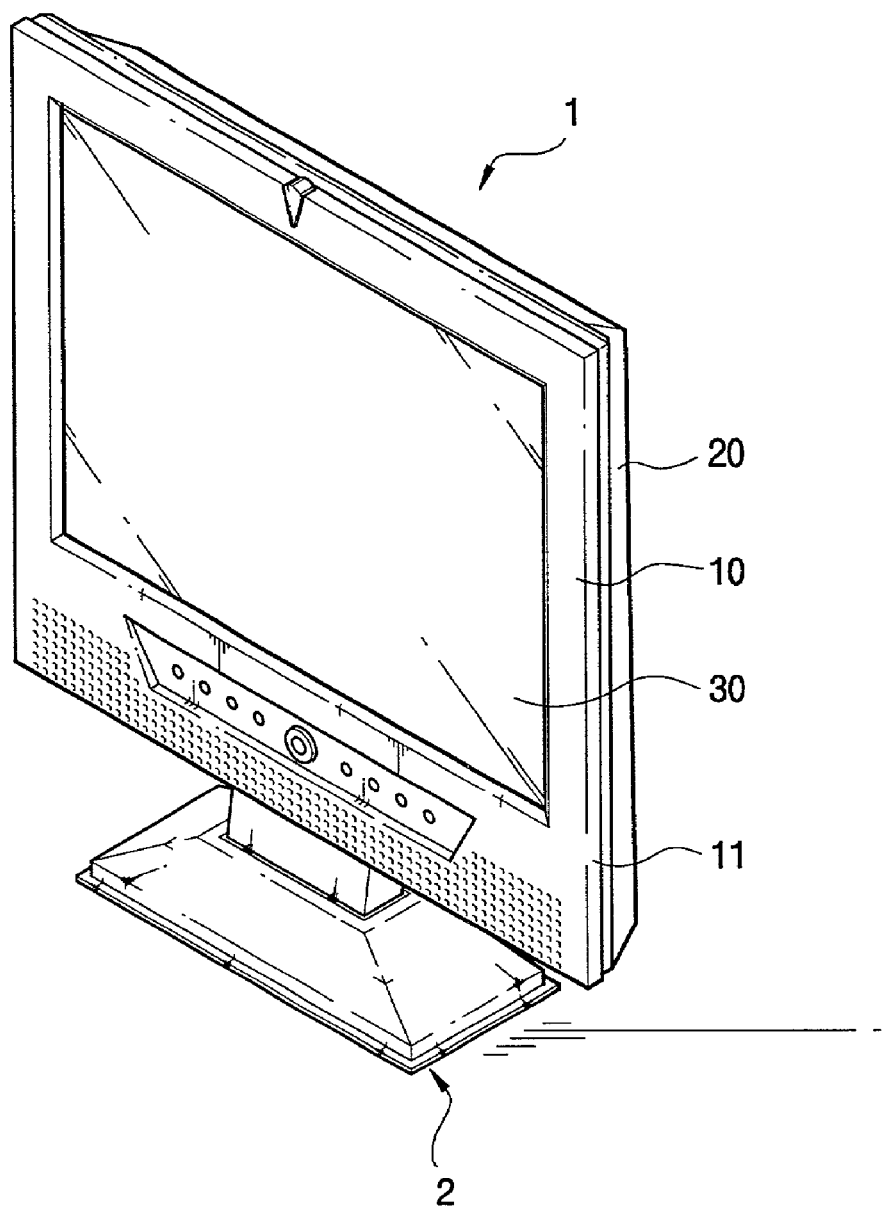
FIG. 3 is a perspective view of a display apparatus according to the present invention.

A display apparatus 1 used in a computer, a TV set, etc. is, as shown in FIG. 3, supported by a supporter 2 and installed on a predetermined place, such as a table, a desk, etc.

Figure 4:
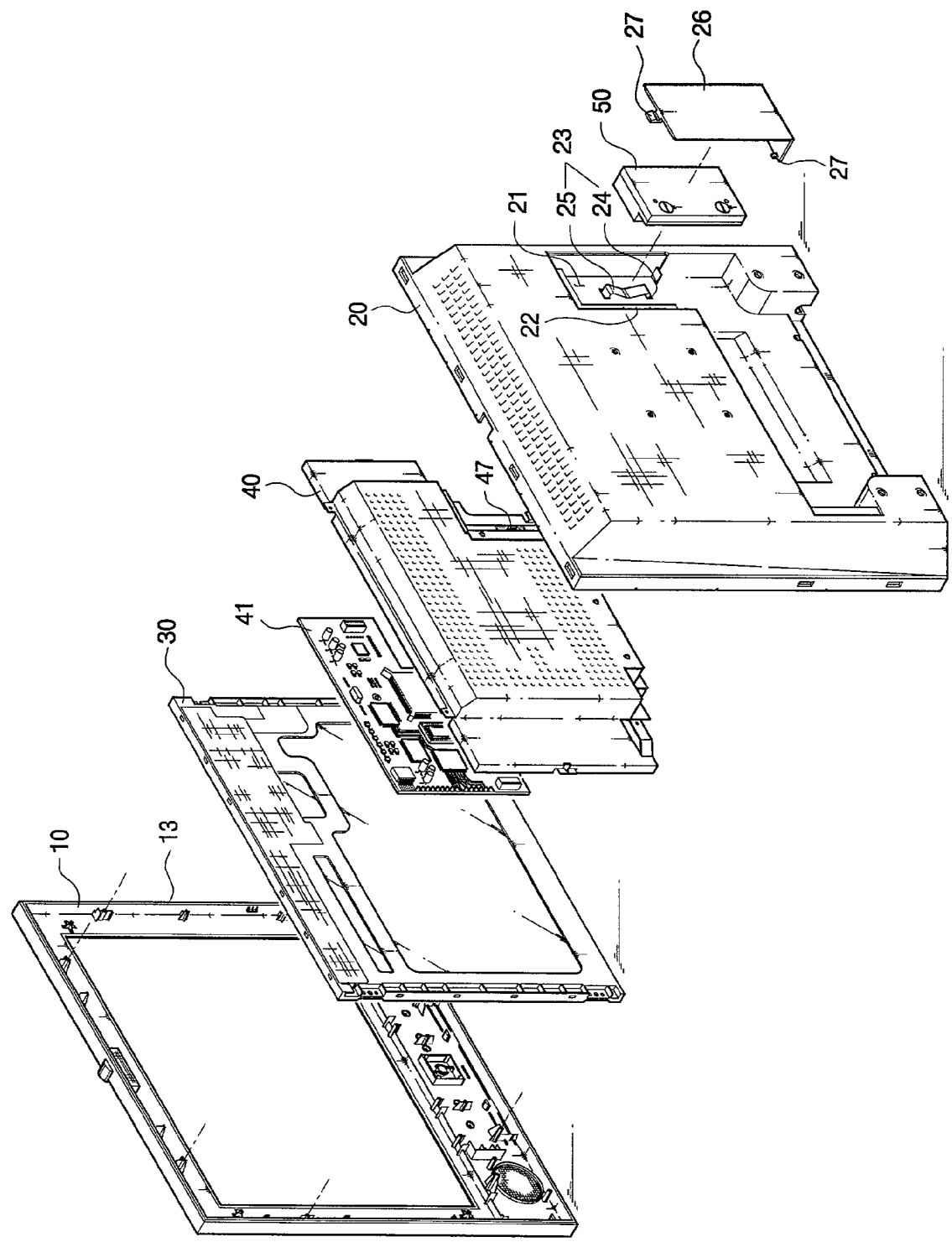
FIG. 4 is an exploded perspective view of the display apparatus in FIG. 3.

Display apparatus 1, as illustrated in FIG. 4, includes a front cover 10 and a rear covers 20 coupled to each other and forming a predetermined accommodating space therebetween, an LCD panel 30 having an effective surface on which a picture is displayed, a PCB supporting member 40 having a main PCB 41 and a connection port 47 and supporting LCD panel 30, and a TV tuner unit 50 detachably attached at rear cover 20 and receiving the TV video signal, transmitting the TV video signal to main PCB 41 through connection port 47 and outputting the TV video signal. Herein, "the effective surface" denotes a front surface of LCD panel 30 exposed through front cover 10.

Front cover 10 includes a front part 11 formed an opening through which the effective surface of LCD panel 30 is exposed to the outside of display apparatus 1, and a skirt part 13 bent toward rear cover 20 at all sides of front part 11. At the back of front cover 10 are provided LCD panel 30 and PCB supporting member 40.

PCB supporting member 40 is combined with front cover 10 to fix LCD panel 30 to front cover 10. In PCB supporting member 40 are, as described above, provided both the main PCB 41 being connected with LCD panel 30 to transmit a picture signal to LCD panel 30, and the connection port 47 transmitting a TV video signal to main PCB 41 from TV tuner unit 50 to thereby output the picture signal to LCD panel 30.

Referring to FIG. 7, main PCB 41 receives a computer picture signal from a personal computer 60 and outputs the picture signal to LCD panel 30 through a signal processor including an A/D converter 44, a scaler 45, and a control part 46.

Figure 5:
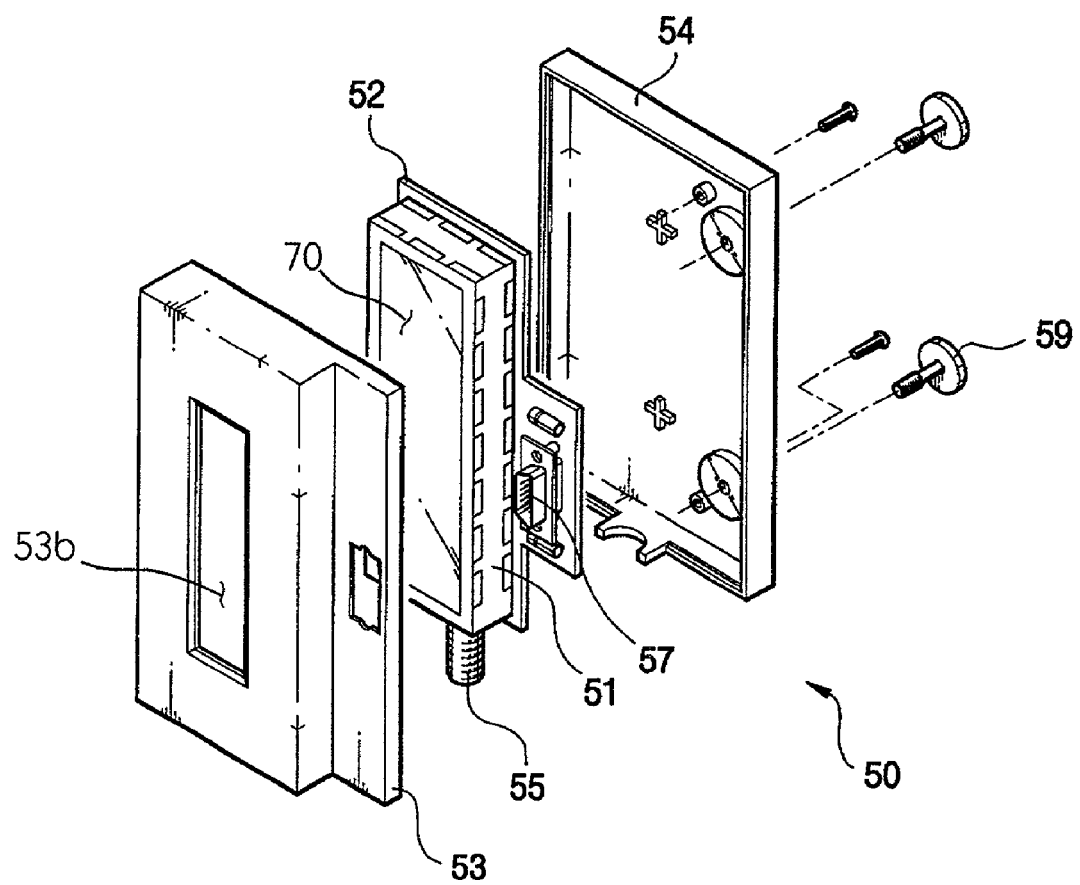
FIG. 5 is an exploded perspective view of a TV tuner unit according to the first embodiment of the present invention.

As shown in FIG. 4, connection port 47 electrically connected to main PCB 41 protrudes from PCB supporting member 40 and is inserted into a hole 22 of rear cover 20. Connection port 47 inserted into hole 22 is exposed to the outside of rear cover 20 and connected to a connector 57 of TV tuner unit 50 as shown in FIG. 5.

Rear cover 20 combined with front cover 10 provides an internal space accommodating LCD panel 30, PCB supporting member 40, main PCB 41, and connection port 47. Further, rear cover 20 includes a tuner unit accommodating part 21 as a receptacle for accommodating the insertion of TV tuner unit 50, the hole 22 into which connection port 47 is inserted, a TV tuner cover 26 attached to rear cover 20 to cover TV tuner unit 50 mounted on tuner unit accommodating part 21, and an earth part 23 for removing harmful electromagnetic waves generated from TV tuner 50.

Tuner unit accommodating part 21 is recessed in an outer surface of rear cover 20 with a predetermined depth so as to accommodate TV tuner unit 50 therein. On a side of tuner unit accommodating part 21 contacting with connector 57 of TV tuner unit 50 is provided hole 22 in which connection port 47 of PCB supporting member 40 is inserted. Therefore, connection port 47 is inserted into hole 22 and then connected with connector 57 of TV tuner unit 50 in order to allow the TV video signal from TV tuner unit 50 to be transmitted to main PCB 41.

Earth part 23, as shown in FIG. 4, includes a through hole 24 formed on a part of the surface of tuner unit accommodating part 21 contacting with the outer surface of TV tuner unit 50, and an earth spring 25 which has two ends fixed at through holes 24 and grounded to LCD panel 30. TV tuner unit 50 is grounded by coupling earth spring 25 to an earth terminal of TV tuner unit 50. When TV tuner unit 50 is inserted into tuner unit accommodating part 21, both ends of earth spring 25 contact LCD panel 30 while a portion of earth spring 25 exposed outside tuner unit accommodating part 21 contacts, as shown in FIG. 5, the earth terminal 70 of a TV tuner 51 contained within TV tuner unit 50. Thus, harmful electromagnetic waves generated from TV tuner unit 50 can be removed.

Figure 6:
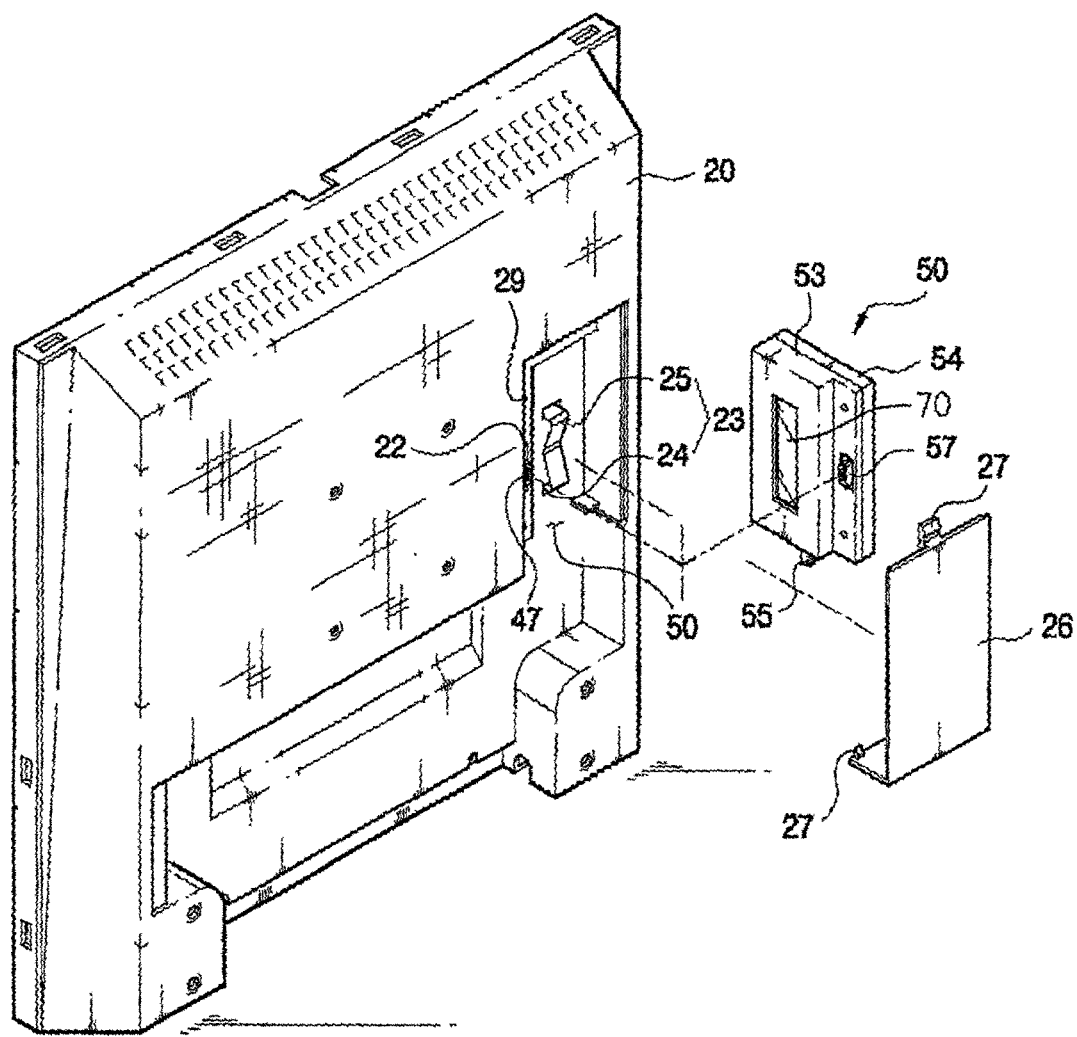
FIG. 6 is a partially enlarged exploded perspective view of the rear of the display apparatus of FIG. 3.

As shown in FIGS. 4 and 6, TV tuner cover 26 is rectangular and bent at a lower portion thereof and has at least two locking hooks 27 at upper and lower ends thereof so as to be removably attached to TV tuner unit accommodating part 21 to cover TV tuner unit 50. Locking hooks 27 of TV tuner cover 26 are caught by hook grooves (not shown) provided at corresponding edges of tuner unit accommodating part 21 so that TV tuner unit 50 inserted into TV tuner unit accommodating part 21 is shielded, and then the outer appearance of the display apparatus may be neatly finished.

Referring to FIG. 5, TV tuner unit 50 includes a TV tuner 51 receiving a TV video signal through an antenna jack 55, a TV tuner PCB 52 on which TV tuner 51 is mounted, two casings 53 and 54 combined to each other to form a housing to accommodate TV tuner 51 and TV tuner PCB 52, at least one screw 59 coupling TV tuner unit 50 to rear cover 20, the connector 57 mounted on TV tuner 51 and exposed to outside of casings 53 and 54 through a connection portal 53c for transmitting a TV video signal from TV tuner 51 to main PCB 41 via connection port 47, and the antenna jack 55 for connecting TV tuner 51 to an external video source (not shown) such as an antenna.

TV tuner 51 receiving the TV video signal through antenna jack 55 does not need a separate device, such as the personal computer and outputs the TV video signal through LCD panel 30. For this end, TV tuner PCB 52 is equipped with TV tuner 51 and a video decoder 58 (see FIG. 7) which converts the TV video signal received by TV tuner 51 into a digital signal having H/V signals and YUV digital signals and then transmits the digital signal to signal processor 43 of main PCB 41 through connector 57 and connection port 47.

Antenna jack 55 is extended from TV tuner 51 and exposed from a lower part of casing 53 as to be connected to the external video source. In one side of TV tuner PCB 52 is provided connector 57.

As shown in FIG. 7, connector 57 is connected to connection port 47 exposed from the backside of rear cover 20 and transmits the digital signal converted by video decoder 58 to signal processor 43 of main PCB 41 through connection port 47. Therefore, signal processor 43 of main PCB 41 can output the picture signal in the display apparatus without any separate and additional device by transmitting the digital signal to LCD panel 30.

With this configuration, an assembling procedure of the display apparatus constructed according to the principle of the present invention will be described hereinbelow.

First, PCB supporting member 40 assembled with main PCB 41 is disposed at a rear side of LCD panel 30 having the effective surface of LCD panel 30 facing toward front cover 10, and then front cover 10 and PCB supporting member 40 are coupled to each other, to thereby couple LCD panel 30 into front cover 10. Thereafter, rear cover 10 equipped with tuner unit accommodating part 21 is disposed at a rear side of PCB supporting member 40, and then rear cover 20 and front cover 10 are coupled to each other.

As shown in FIG. 6, connection port 47 electrically connected through hole 22 with main PCB 41 is exposed outside rear cover 20 of the display apparatus. LCD panel 30 is grounded at both ends of earth spring 25 provided in tuner unit accommodating part 21.

Thereafter, TV tuner unit 50 is disposed in tuner unit accommodating part 21 of rear cover 20, and then screw 59 is inserted through TV tuner unit 50 to be coupled to female screw projection 29 of rear cover 20 so that TV tuner unit 50 is fixedly coupled to rear cover 20 and connector 57 of TV tuner unit 50 is connected to connection port 47. Further, where TV tuner unit 50 is disposed in tuner unit accommodating part 21, earth spring 25 exposed from tuner unit accommodating part 21 contacts TV tuner 51 at the earth terminal 70 of TV tuner 51 so as to eliminate harmful electromagnetic waves generated from TV tuner unit 50.

Finally, TV tuner cover 26 is assembled with rear cover 20 by being coupled to tuner unit accommodating part 21 so as to shield TV tuner unit 50 and finish the outer appearance of the display apparatus neatly. Consequently, TV tuner unit 50 is provided easily combined with and removed from the display apparatus. A removing process of TV tuner unit 50 from the display apparatus is performed in the reverse order of the assembling process.

Hereinbelow, the procedure of outputting the TV video signal received from TV tuner 51 on LCD panel 30 will be schematically described with reference to FIG. 7.

First, the TV video signal received from TV tuner 51 is converted into the digital signal having H/V signals and YUV digital signals through video decoder 58 of TV tuner PCB 52. The converted H/V signals pass through connector 57 of TV tuner unit 50 and are transmitted to control part 46 of signal processor 43 of main PCB 41 through connection port 47, and YUV digital signals pass through connector 57 of TV tuner unit 50 and are transmitted to scaler 45 of signal processor 43 of main PCB 41 through connection port 47. Then, signal processor 43 of main PCB 41 adjusts a scale, etc. based on the received digital signal having H/V signals and YUV digital signals and transmits the adjusted digital signal to LCD panel 30, to thereby output the TV video signal.

Figure 8:
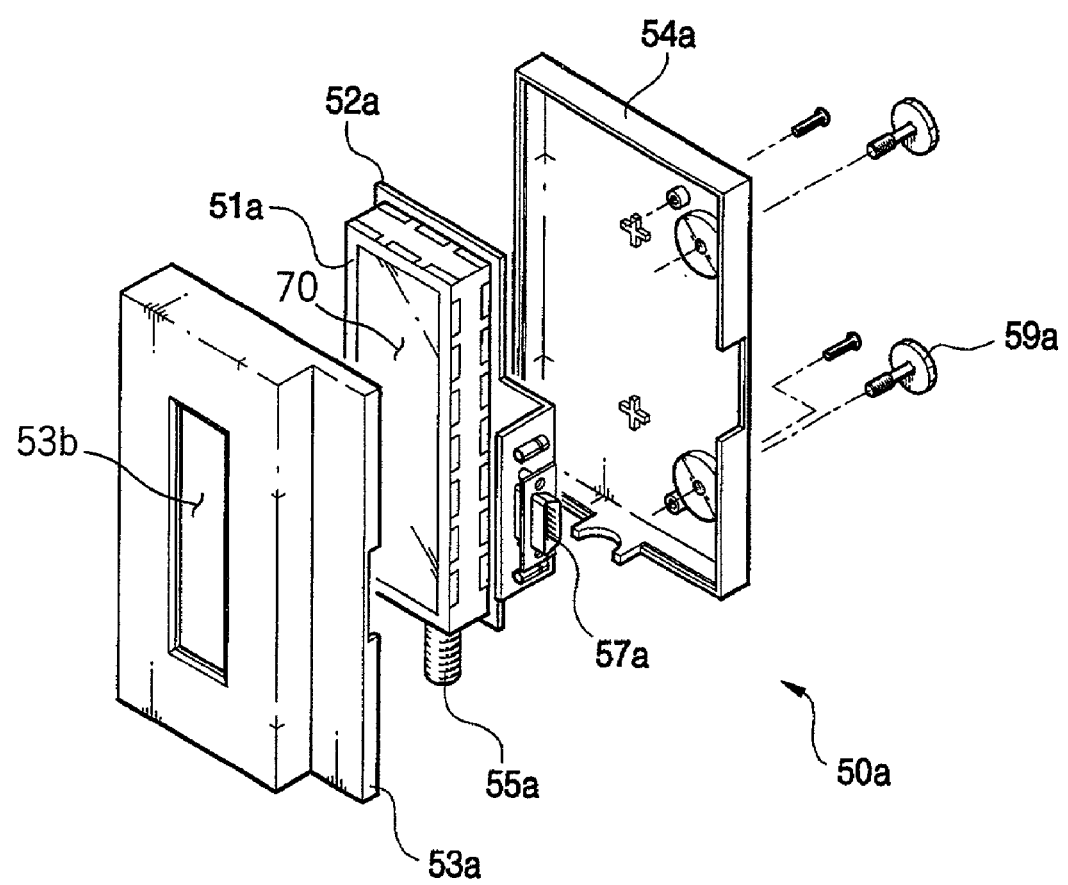
FIG. 8 is an exploded perspective view of a TV tuner unit according to a second embodiment of the present invention.
Figure 9:
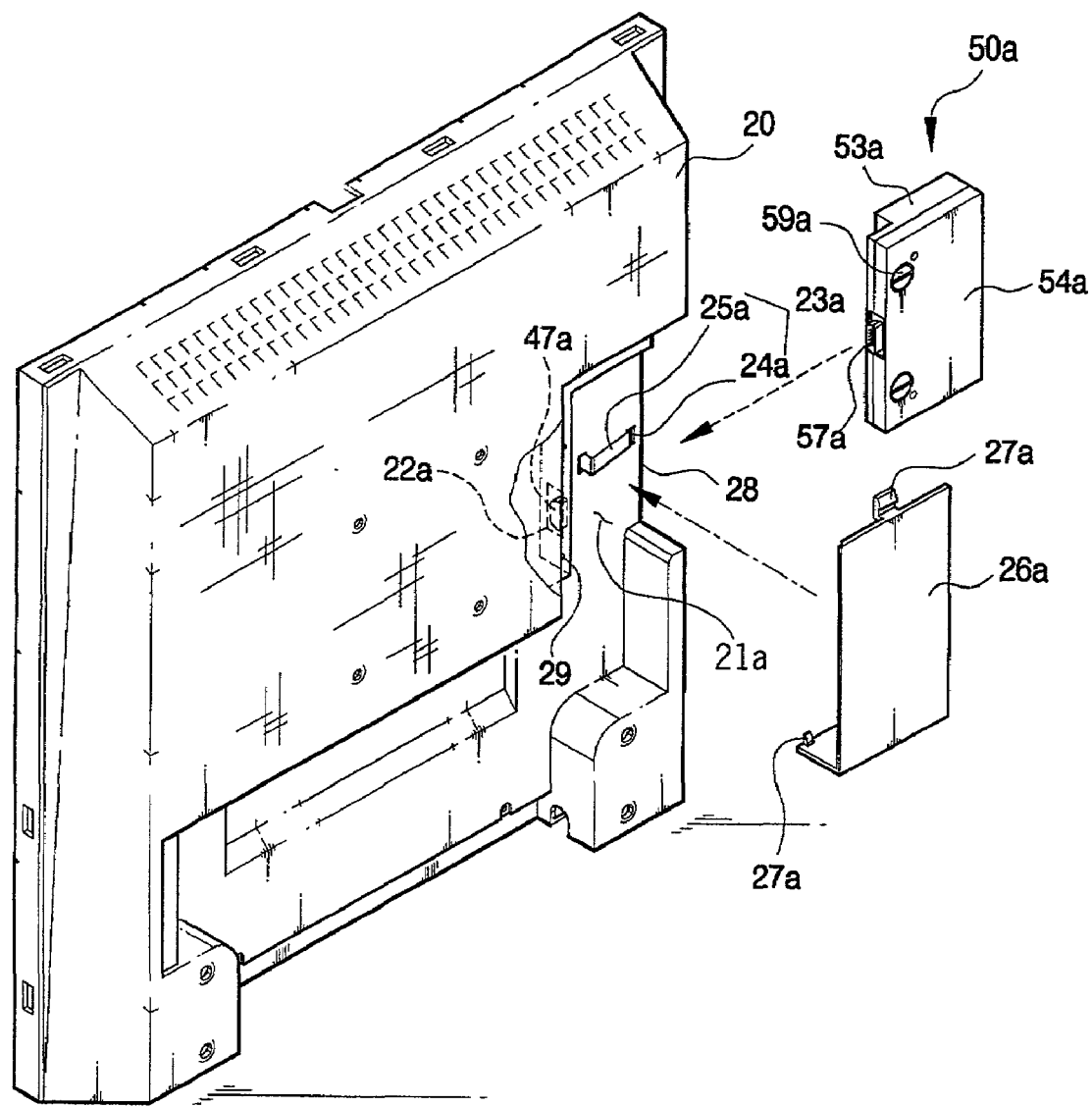
FIG. 9 is an exploded perspective view of the rear of the display apparatus according to the second embodiment of the present invention.

FIGS. 8 and 9 are exploded perspective views of a second embodiment of the display apparatus constructed according to the principle of the present invention. As shown therein, the display apparatus has the same components as the display apparatus according to the above-described first embodiment.

A tuner unit accommodating part 21a recessed in the outer surface of the rear cover 20 by a predetermined depth has a sliding opening part 28. TV tuner unit 50a is slidably inserted into tuner unit accommodating part 21a by sliding along a sliding surface of tuner unit accommodating part 21a through the sliding opening part 28, while TV tuner unit 50 of FIGS. 5 and 6 is coupled to tuner unit accommodating part 21 by being pressed in a direction perpendicular to a surface of tuner unit accommodating part 21.

Further, unlike hole 22 of FIGS. 4 and 6, a hole 22a of FIG. 9 is formed on a portion perpendicular to the sliding surface of tuner unit accommodating part 21a being contacted with TV tuner unit 50a along an inserting direction thereof, so that connection port 47a is inserted thereto. Accordingly, connection port 47a is inserted into hole 22a and connected to a connector 57a of TV tuner unit 50a when TV tuner unit 50a slides along the sliding surface of tuner unit accommodating part 21a, to thereby transmit TV video signal from TV tuner unit 50a to main PCB 41.

Harmful electromagnetic waves generated from TV tuner unit 50a are removed by an earth part 23a of tuner unit accommodating part 21a. Earth part 23a, as shown in FIG. 9, includes a through hole 24a formed on the sliding surface of tuner unit accommodating part 21a contacting TV tuner unit 50a in parallel with the inserting direction of TV tuner unit 50a, and an earth spring 25a having two ends thereof inserted into through hole 24a to contact LCD panel 30 or main PCB 41, and earth spring 25a having a portion disposed between two ends and being contacted with a TV tuner earth terminal 70 of TV tuner unit 50a. Accordingly, where TV tuner unit 50a is inserted into tuner unit accommodating part 21a by sliding along the sliding surface via sliding opening part 28, the ends of earth spring 25a become in contact with LCD panel 30 while the portion thereof exposed from tuner unit accommodating part 21a contacts the TV tuner earth terminal 70 of TV tuner unit 50a. Thus, harmful electromagnetic waves generated from TV tuner unit 50a can be eliminated.

As shown in FIG. 9, a TV tuner cover 26a bent at the lower portion thereof has at least two locking hooks 27a at the upper and lower ends thereof so as to be removably coupled to tuner unit accommodating part 21a to cover TV tuner unit accommodating part 21a and TV tuner unit 50a.

Accordingly, locking hooks 27a of TV tuner cover 26 are caught by hook grooves (not shown) formed in the edge of tuner unit accommodating part 21a so that TV tuner unit 50a inserted into TV tuner unit accommodating part 21a is shielded.

As illustrated in FIGS. 8 and 9, TV tuner unit 50a of the display apparatus constructed according to the second embodiment of the present invention includes TV tuner 51a receiving the TV video signal, TV tuner PCB 52a on which TV tuner 51a is mounted, separate casings 53a and 54a which are coupled to each other to accommodate TV tuner 51a and TV tuner PCB 52a, screw 59a coupling TV tuner unit 50a on rear cover 20, connector 57a exposed from a connection portal formed by cutouts 53d' and 53d'' in casings 53a and 54a, respectively, for transmitting a TV video signal from TV tuner 51a to main PCB 41a through connection port 47a, and a antenna jack 55a for connecting TV tuner 51a to the external video source (antenna).

With this configuration, an assembling procedure of the display apparatus according to the second embodiment of the present invention will be described hereinbelow.

First, PCB supporting member 40 assembled with main PCB 41 is disposed at a rear side of LCD panel 30 having the effective surface of LCD panel 30 facing toward front cover 10, and then front cover 10 and PCB supporting member 40 are coupled to each other, to thereby couple LCD panel 30 into front cover 10. Thereafter, rear cover 10 provided with the tuner unit accommodating part 21a is disposed at a rear side of PCB supporting member 40, and rear cover 20 and front cover 10 are coupled to each other.

As shown in FIGS. 8 and 9, connection port 47a, electrically connected to main PCB 41, is exposed from rear cover 20 through hole 22a. The backside of LCD panel 30 contacts both ends of earth spring 25a provided in tuner unit accommodating part 21a.

Thereafter, TV tuner unit 50a is slid into tuner unit accommodating part 21a of rear cover 20, and then screw 59a is inserted into TV tuner unit 50a and coupled to female screw projection 29 of rear cover 20 so that TV tuner unit 50a is attached to rear cover 20, and so that connector 57a of TV tuner unit 50a remains connected to connection port 47a. Further, where TV tuner unit 50a is disposed in tuner unit accommodating part 21a, earth spring 25a exposed from tuner unit accommodating part 21a contacts TV tuner earth terminal 70 so as to remove harmful electromagnetic waves generated from TV tuner unit 50a.

Finally, TV tuner cover 26a is coupled to tuner unit accommodating part 21a of rear cover 20 so as to shield TV tuner unit 50a. Consequently, the display apparatus 1 is provided with TV tuner unit 50a easily coupled to and removed from the display apparatus. The process of removing the TV tuner unit 50a from display apparatus 1 is performed in the reverse order of the assembling process without disassembling the display apparatus 1.

In the above description, as an example for coupling TV tuner unit 50 to display apparatus 1, both female screw projection 29 of rear cover 20 and screw 59 of TV tuner unit 50 are used. However, various manners and different types of coupling members may be used for coupling TV tuner unit 50 to display apparatus 1.

In the above description, at rear cover 20 are provided tuner unit accommodating part 21 and hole 22 in which connection port 47 is inserted. However, they may be provided at front cover 10 as necessary. In this case, connection port 47 is inserted into a hole formed at front cover 10 using an extension cord.

In the above description, TV tuner cover 26 is coupled to rear cover 20 by coupling two locking hooks 27 formed at both ends of TV tuner cover 26 to tuner unit accommodating part 21 or 28. However, it is possible to couple TV tuner cover 26 to rear cover 20 by various manners such as a screw combination, etc. instead of locking hooks 27.

As described above, the TV tuner can be easily combined into and removed from the display apparatus by using the connection port electrically connected to the main PCB and the TV tuner unit equipped with the TV tuner receiving the TV video signal and by using the connector by which the received TV video signal is transmitted to the main PCB through the connection port.

As described above, the present invention provides the display apparatus in which a TV tuner is easily combined and removed.

Although the preferred embodiments of the present invention have been disclosed for illustrative purpose, those skilled in the art will appreciate that various modifications, additions and substitutions are possible, without departing from the scope and spirit of the invention as disclosed in the accompanying claims.

What is claimed is:

1. A display apparatus, comprising:
   a front cover;
   a rear cover coupled to said front cover;
   a display panel and a main PCB (Printed Circuit Board) disposed between said front cover and rear cover;
   a tuner unit having a casing, a tuner contained within said casing, and a connector electrically extended from said tuner and protruding through said casing;
   a receptacle formed on an outside surface of said rear cover; and
   a connection port connected to said main PCB, protruding through a side defining said receptacle to be connected to said connector of said tuner unit when said tuner unit is inserted into said receptacle.

2. The display apparatus of claim 1, with said receptacle accommodating the insertion of said tuner unit while said rear cover is coupled to said front cover.

3. The display apparatus of claim 2, further comprising an earth spring protruding from said outside surface of said rear cover and facing said casing, said earth spring coming into contact with an earth terminal of said tuner unit when said tuner unit is coupled to said rear cover.

4. The display apparatus of claim 3, with said rear cover comprising:
   a passage formed on said outside surface of said rear cover; and
   said earth spring having one end inserted into said passage and the other end extended from said one end and exposed outside said rear cover so as to contact said earth terminal of said tuner unit.

5. The display apparatus of claim 1, with said connection port being parallel to an inserting direction of said tuner unit into said receptacle.

6. The display apparatus of claim 5, with said tuner unit being inserted into said receptacle by sliding through a sliding opening part formed on said outside surface of said rear cover.

7. The display apparatus of claim 1, further comprising:
   said tuner unit including an earth terminal exposed outside said casing; and
   said rear cover having a through hole formed on a side defining said receptacle of said rear cover in parallel with a sliding inserting direction of said tuner unit into said receptacle, said rear cover having an earth spring mounted in said through hole and elastically contacting said earth terminal.

8. The display apparatus of claim 1, with said rear cover formed with a hole through which said connection port coupled to said main PCB is inserted in order to be exposed to outside of said rear cover.

9. The display apparatus of claim 1, further comprising a tuner cover removably coupled to said side and shielding said tuner unit attached to said rear cover.

10. The display apparatus of claim 1, further comprising a coupling member coupling said tuner unit to said outside surface of said rear cover.

11. The display apparatus of claim 10, said coupling member comprising a female screw formed on said side of said rear cover and a male screw coupling said tuner unit to said rear cover through said female screw.

12. The display apparatus of claim 1, with said tuner unit further comprising a tuner PCB having a video decoder converting a TV video signal transmitted from an external surface to said tuner into a digital signal and transmitting said digital signal to said main PCB through said connector and said connection port.

13. A tuner apparatus connectable to a recessed surface area on the back of a housing of a display device, the housing covering a display panel and a main printed circuit board, said tuner apparatus comprising:
    a casing having a front cover and a back cover; and
    a tuner disposed between said front and back covers of said casing, said tuner having an antenna terminal for receiving a television signal and a connector for transmitting a decoded television signal to said display device, said connector protruding from said casing through a first opening, said antenna terminal protruding from said casing through a second opening formed when said front cover is connected to said back cover.

14. The tuner apparatus as set forth in claim 13, said front cover including said first opening.

15. The tuner apparatus as set forth in claim 13, said first opening being formed when said front cover is connected to said back cover.

16. The tuner apparatus as set forth in claim 13, further comprising:
    said front cover including a second opening; and
    said tuner including an earth terminal, said earth terminal engaging an earth spring protruding from the back of the housing of the display device within said recessed surface area, when said casing is inserted into said recessed surface area.

17. The tuner apparatus as set forth in claim 14, further comprising:
    said front cover including a second opening; and
    said tuner including an earth terminal, said earth terminal engaging an earth spring protruding from the back of the housing of the display device within said recessed surface area, when said casing is inserted into said recessed surface area.

18. The tuner apparatus as set forth in claim 15, further comprising:
    said front cover including a second opening; and
    said tuner including an earth terminal, said earth terminal engaging an earth spring protruding from the back of the housing of the display device within said recessed surface area, when said casing is inserted into said recessed surface area.

19. The tuner apparatus as set forth in claim 13, further comprising:
    at least one screw passing through, via the back cover, said casing for securing said tuner apparatus to said recessed surface area on the back of the housing of said display device.

20. The tuner apparatus as set forth in claim 13, further comprising:
    a tuner cover for covering said tuner apparatus when said casing is inserted into said recessed surface area.

21. A tuner apparatus connectable to a recessed surface area on the back of a housing of a display device, the housing covering a display panel and a main printed circuit board, said tuner apparatus comprising:
    a casing having a front cover and a back cover; and
    a tuner unit being disposed between said front and back covers of said casing;
    said tuner having an input terminal for receiving a video signal;
    said tuner having an output terminal for transmitting a decoded video signal to said display device;
    said tuner including an earth terminal, said earth terminal engaging an earth spring protruding from the back of the housing of the display device within said recessed surface area, when said casing is slid through a side opening in the side of the back of said housing into said recessed surface area.

22. The tuner apparatus as set forth in claim 21, further comprising:
    said output terminal protruding from said casing through a first opening formed when said front cover is connected to said back cover; and
    said input terminal protruding from said casing through a second opening formed when said front cover is connected to said back cover.

23. The tuner apparatus as set forth in claim 22, said earth terminal being exposed through a cut out opening in said front cover.

24. The tuner apparatus as set forth in claim 21, further comprising:
    at least one screw passing through, via the back cover, said casing for securing said tuner apparatus to said recessed surface area on the back of the housing of said display device.

25. The tuner apparatus as set forth in claim 21, further comprising:
    a tuner cover for covering said tuner apparatus when said casing is inserted into said recessed surface area.

* * * * *